United States Patent Office 3,121,195
Patented Feb. 11, 1964

3,121,195
SERVO POSITIONING APPARATUS
Troy D. Graybeal, Anaheim, and Harold H. Humpal, Santa Ana, Calif., assignors to The Siegler Corporation, Anaheim, Calif., a corporation of Delaware
Filed Aug. 21, 1961, Ser. No. 132,920
9 Claims. (Cl. 318—19)

The present invention relates to servo positioning apparatus and more particularly to an apparatus for positioning a movable member such as an antenna.

Various types of servo positioning apparatus have been employed in the past to control the position of a movable member such as the movement of a platform or an antenna about one axis of freedom. In the past, A.C. motors have generally been found unsatisfactory in servo positioning apparatus where relatively large power and/or high speed of response is required. Where large amounts of power are required of the drive motor at low speeds, high current is required for prior art A.C. motors (i.e. induction motors). Conventional A.C. motors do not have a satisfactory control characteristic for use in power servo mechanisms because the torque is not directly or readily controllable by an error signal independent of speed. For these reasons, power servo positioning apparatus heretofore have generally utilized D.C. motors or hydraulic motors as the primary driving means.

The operating power losses of most prior art D.C. motor servo systems and hydraulic servo systems are high which results in low power efficiency. Such systems are also complex, expensive, difficult to maintain and often permit backlash which impairs the accuracy of the system. Such backlash cannot be permitted where accuracy is required.

The disadvantages of prior art servo positioning apparatus for controlling the position of a movable member are overcome by the present invention which employs controlled flux alternating current (A.C.) dynamoelectric motors for accurately controlling the position of the movable member. Controlled flux A.C. dynamoelectric motors are characterized by an armature and a polyphase field winding which may be excited by alternating current to provide a magnetic field that rotates relative to the field structure. In such motors the speed of the rotating magnetic flux set up by the field winding (which is generally wound on the rotor) is made up of two components: (1) the direction and speed of the mechanical rotation of the field winding relative to the armature, and (2) the phase and frequency of the A.C. voltage applied to the field windings. The sum of these two components must at all times be equal to the speed of the magnetic field set up by the armature for the motor to develop torque effectively. Controlled flux A.C. machines are generally constructed with a non-salient pole field and armature structure.

The field excitation voltage or current applied to controlled flux A.C. machines has a frequency equal to the difference between the frequency of the current in the armature (stator) and the rotational frequency of the machine. The rotational frequency of the machine is equal to the speed of rotation of the rotor in revolutions per second, times the number of pairs of poles for which the machine is wound. The difference between the frequency of the current in the armature or stator and the rotational frequency is generally referred to as the slip frequency because it is always equal to the armature frequency times the slip, where the slip is expressed as a per unit value and is equal to the difference between synchronous speed and the actual speed divided by the synchronous speed. Apparatus for providing A.C. excitation of slip frequency is disclosed in the following copending application of Troy D. Graybeal and Charles Philip Cardeiro which is assigned to the assignee of the present invention: (1) Control Apparatus for Alternating Current Dynamoelectric Machines, Serial No. 81,389, filed January 9, 1961, and (2) a copending application of Troy D. Graybeal, assigned to the assignee of the present invention, Control Apparatus for Alternating Current Dynamoelectric Machines, Serial No. 91,925, filed February 27, 1961.

The magnitude of the torque developed by a controlled flux A.C. motor varies with the space phase angle between the magnetic flux set up by the armature current and the magnetic flux set up by the field excitation current. The magnitude of this torque may be controlled by controlling this space phase angle or by controlling the time phase relationship of the field excitation current relative to the armature current.

In accordance with the present invention at least two controlled flux A.C. motors are utilized to position a movable member such as a platform or antenna about a desired axis of freedom. The A.C. motors are each provided with a polyphase field winding, an armature and a shaft coupled to the movable member to drive the movable member. A source of energizing potential is connected to the armature of each of the motors. Means responsive to the speed of each of the motors and to the frequency of the alternating current energizing potential are provided for applying polyphase regulating signals of slip frequency to the field windings of each of the motors. A source of control signals representative of the desired position of the movable member is provided to control the position of the member. Means responsive to the control signals and to the position of the movable member are included for controlling the time phase relationship of the polyphase regulating signals applied to the field windings of the motors to control the torque developed by the motors and thereby the position of the movable member in accordance with the control signals. Additional means are provided for controlling the time phase relationship of the polyphase regulating signals to maintain the torque developed by one of the motors at a value different than the torque developed by the other motor whereby at least one of the motors will always transmit a force to the movable member to prevent backlash.

The invention is described in more detail in reference to the accompanying drawings in which.

Figure 1:
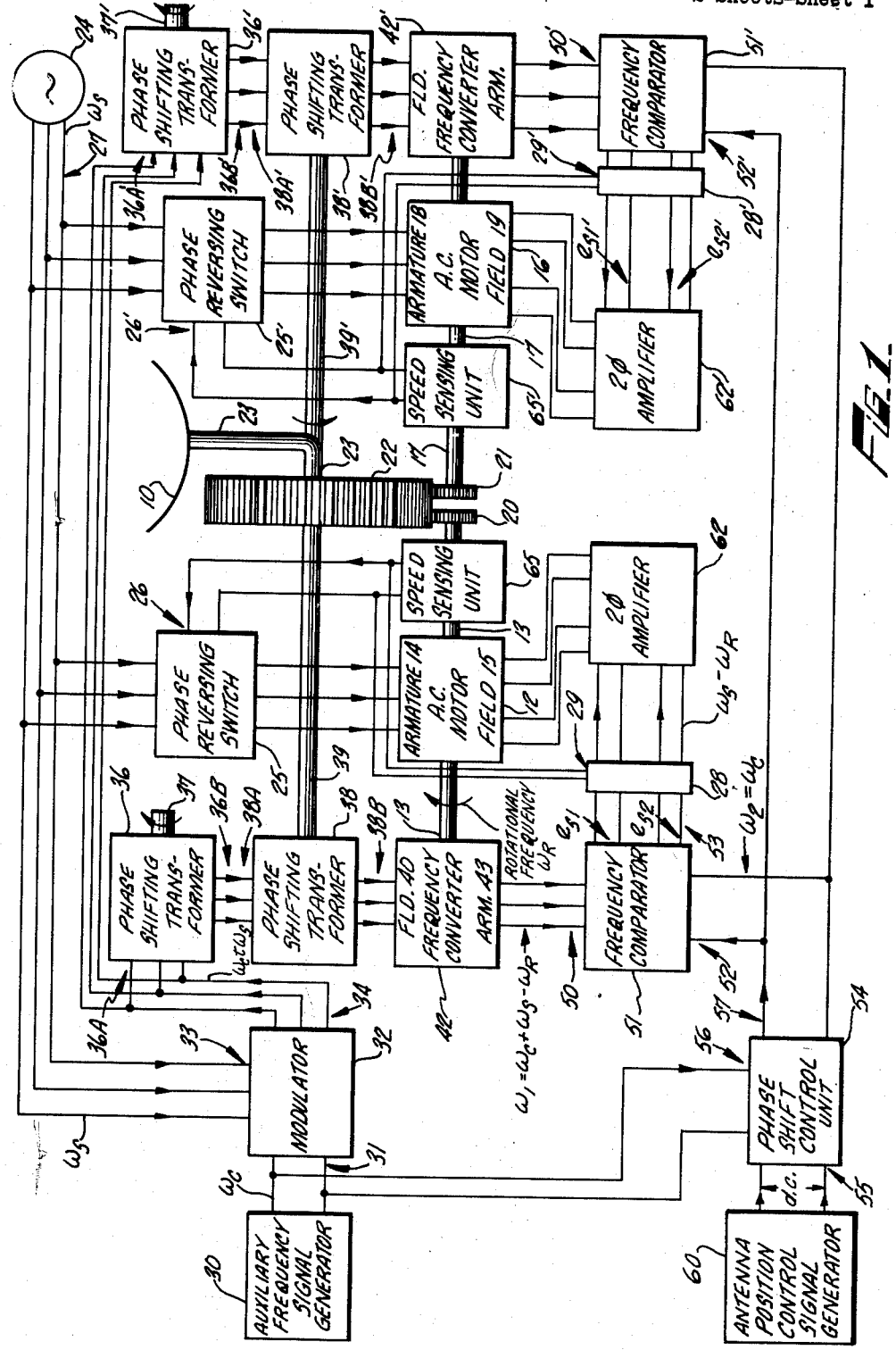
FIG. 1 is a block diagram of an apparatus constructed in accordance with the present invention.

Referring now to the drawings and more particularly to FIG. 1 there is illustrated a movable member such as an antenna 10. First and second controlled flux A.C. motors 12 and 16 are coupled to the antenna 10 by means of gears 20, 21 and 22 and an antenna shaft 23 which connects the antenna to the gear 22. The motors 12 and 16 are provided with shafts 13 and 17, respectively, which are connected to the gears 20, 21 as shown. The motors 12 and 16 are provided with armatures 14 and 18, respectively, which are illustrated as three phase and connected to a suitable source of energizing potential 24 through phase reversing switches 25 and 25' and a transmission line 27. The phase reversing switches 25 and 25' serve to reverse the phase sequence of the currents in the armatures 14 and 18 of the motors 12 and 16, respectively, to permit the motors to operate in a reverse direction as will be more fully described. The source of energizing potential 24 may be a conventional generator for providing energizing potential of any desired frequency, for example, 60 cycles. The motors 12 and 16 are also provided with polyphase field windings 15 and 19, respectively (illustrated as two phase).

Field excitation of slip frequency is obtained for the motors 12 and 16 by comparing the frequency of the current applied to the armatures of the motors with a frequency representative of the speed of the motors as will be explained.

To permit the motors 12 and 16 to operate and develop torque at zero speed, an auxiliary frequency signal generator 30 is provided for producing auxiliary frequency signals having a frequency $\omega_C$. The auxiliary frequency signals are applied to one input 31 of a modulator or frequency changer 32. The alternating current energizing source 24 having an output frequency $\omega_S$ is connected to another input circuit 33 of the modulator 32. The modulator 32 adds the frequency $\omega_C$ of the auxiliary frequency signals to the frequency $\omega_S$ of the source of energizing potential 24 and provides an output signal in the output circuit 34 thereof which has a frequency equal to $\omega_C + \omega_S$. The output of the modulator 32 which is illustrated as three phase is applied to the field winding 40 of a frequency converter 42 through a pair of phase shifting transformers 36 and 38.

The phase shifting transformer 36 is provided with an input shaft 37, the position of which controls the magnitude of the phase shift between the signals on the input circuit 36A and the output circuit 36B thereof. The position of the shaft 37 may be manually or automatically controlled. The phase shifting transformer 38 is provided with an input shaft 39 which is connected to the antenna 10. The position of the shaft 39 controls the magnitude of the phase shift between the signals on the input circuit 38A and output circuit 38B of the phase shifting transformer 38 in a well known manner. Thus the signals in the output circuit 38B of the transformer 38 have a phase shift representative of the difference in the positions of the shafts 37 and 39.

The frequency converter 42 has its rotor (on which the field windings 40 may be wound) connected to the shaft 13 of the motor 12 for comparing the source and auxiliary frequency $\omega_S + \omega_C$ with the rotational frequency $\omega_R$ of the motor 12. The field winding 40 of the frequency converter 42 is wound so that the rotating magnetic field set up by the alternating current applied to the field winding 40 is in a direction opposite to the rotation of the shaft 13. As a result a first command signal is induced in the armature 43 of the frequency converter 42 which has a frequency $\omega_1$ equal to $\omega_C + \omega_S - \omega_R$. The output or first command signal from the frequency converter 42 is applied to one input circuit 50 of a frequency comparator 51 which may be a conventional phase sensitive demodulator. An electronic or mechanical phase sensitive demodulator may be utilized as the frequency comparator 51 as is well known in the art. The frequency comparator 51 is provided with a second input circuit 52 to which is applied a second command signal having a frequency $\omega_2$ which is equal to the auxiliary frequency $\omega_C$. A phase shift control unit 54 is connected in series between the auxiliary frequency signal generator 30 and the input circuit 52 of the frequency comparator 51 to supply the second command signal having a frequency $\omega_C$. The frequency comparator 51 obtains the difference in the frequencies of the first and second command signals and provides a polyphase regulating signal (illustrated as two phase $e_{s1}$ and $e_{s2}$) across the output circuit 53 thereof which has a frequency equal to $\omega_S - \omega_R$. This is the slip frequency of the motor 12. The output from the frequency comparator 51 is applied through a polyphase amplifier 62 (illustrated as two phase) to the field winding 15 of the motor 12. Thus the rotating magnetic field produced by the field winding 15 which is equal to the sum of the rotational frequency $\omega_R$ and the slip frequency $(\omega_S - \omega_R)$ is equal to the speed of the magnetic field set up by the armature 14 $(\omega_S)$.

Where it is desired to achieve precise torque control characteristics from the motor 12 in response to the amplifier input signals $e_{s1}$, $e_{s2}$ compensation circuitry should be used such as disclosed in the copending application of Troy D. Graybeal and Charles Philip Cardeiro entitled "Control Apparatus for Alternating Current Dynamoelectric Machines," Serial No. 81,381, filed January 9, 1961.

The apparatus for providing excitation current of slip frequency to the field winding 19 of the motor 16 is identical to that just described in connection with the motor 12 and similar components are marked with primed reference numerals.

To control the position of the antenna 10 it is necessary to control the time phase relationship of the polyphase regulating signals $e_{s1}$, $e_{s2}$, $e_{s1'}$ and $e_{s2'}$ which are applied to the field windings of the motors 12 and 16 in accordance with the desired position of the antenna. This control may be achieved by positioning the shafts 37 and 37′ of the phase shifting transformers 36 and 36′ manually or automatically in accordance with the desired position of the antenna. In this case the phase shifting transformers 36 and 36′ should be mechanically coupled together with provision for adjusting the positions of the shafts of the phase shifting transformers with respect to each other to provide the desired degree of torque differential between the two motors 12 and 16 to eliminate backlash as is more fully described later. To control the mechanical rotation of the shafts 37 and 37′ of the phase shifting transformers 36 and 36′, a mechanical control signal is required. The phase shift control unit 54 is not required for this type of operation and the output from the auxiliary frequency generator 30 may be coupled directly to the input circuits 52 and 52′ of the frequency comparators 51 and 51′.

To control the antenna in accordance with an electrical signal, an antenna position control signal generator 60 is preferably provided. The control signal generator may be in the form of a transducer coupled to a separate antenna (i.e. a directional antenna) which is manually or otherwise controlled to assume the desired position of the antenna 10. The control signal generator 60 may also be a pre-recorded record of signals representing the desired position of the antenna 10 with respect to time. The output from the antenna position control generator 60 is in the form of a direct current signal and is applied to one input 55 of the phase shift control unit 54 to control the magnitude of the phase shift of the auxiliary frequency signal between the input 56 and the output 57 of the control unit 54. The phase shift control unit 54 may be of any conventional type and serves to control the time phase relationship of the second command signal applied to the frequency comparators 51 and 51′ in response to the D.C. output signal from the generator 60.

In operation the torque developed by the motors 12 and 16 is dependent upon the time phase relationship of the polyphase regulating signals applied to the field windings thereof which in turn are controlled by the time phase difference between the first and second command signals applied to the frequency comparators 51 and 51′. Thus motors 12 and 16 apply torque to the gear 22 to drive the antenna 10 as long as the phase shift produced by the transformers 38 and 38′ is more or less than the phase shift produced by the control unit 54. This causes the antenna 10 to follow the position dictated by the control signal from the generator 60.

To prevent backlash in the apparatus it is necessary to insure that at least one of the motors 12 and 16 is always applying torque to the gear 22. For this reason, means such as one or both of the phase shifting transformers 36 and 36′ are provided to control the time phase relationship of the polyphase regulating signals applied to the field windings of one of the motors 12 and 16 to maintain the torque developed by one of the motors at a value different than the torque developed by the other motor. To accomplish this it is only necessary to adjust the input shafts 37 and 37' of the phase shifting transformers 36 and 36' to different positions so that the amount of phase shift produced by the transformers 36 and 36' will be different. Obviously only one of the transformers 36 and 36' is required for this purpose.

To control the motors 12 and 16 so that they always operate at a slip no greater than 100% for either direction of rotation it is necessary to reverse the phase sequence of the stator and rotor voltages when the motors are near zero speed to reverse the direction of the magnetic fields. To achieve this result, armature phase reverse switches 25 and 25' are connected between the armatures 14 and 18 and the source of energizing potential 24. Field excitation reversing switches 28 and 28' are connected between the frequency comparators 51 and 51' and the amplifiers 62 and 62', respectively, as shown. To determine when the motors 12 and 16 are near zero speed, speed sensing units 65 and 65' are coupled to the shafts 13 and 17, respectively. The speed sensing units 65 and 65' may be conventional plugging switches or tachometers for providing output signals representative of the speed of the motors 12 and 16 to the control input circuits 26 and 26' of the armature switches 25 and 25' and the input circuits 29 and 29' of the field excitation switches 28 and 28'. To insure that at least one of the motors 12 and 16 is always applying torque to the gear 22, it is necessary to switch the motors 12 and 16 at different speeds. For example, the motor 12 may be switched when its shaft is rotating at 12 r.p.m. in the forward direction and the motor 16 may be switched when its shaft is rotating at 12 r.p.m. in the reverse direction.

Figure 2:
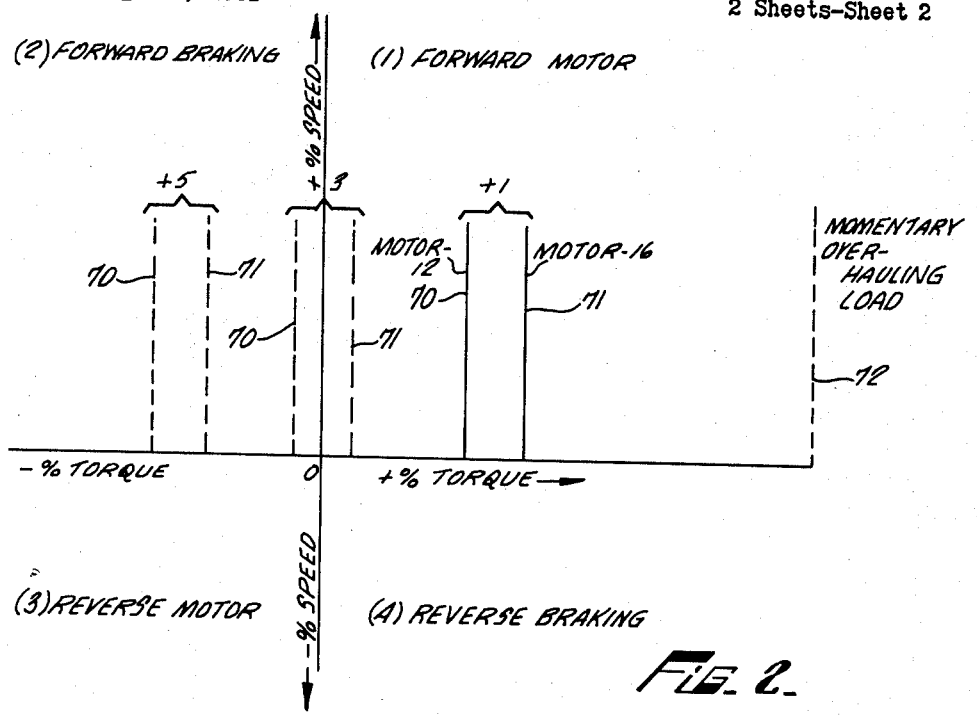
FIG. 2 is a graph illustrating the torque characteristics developed by the motors in the apparatus of FIG. 1.
Figure 3:
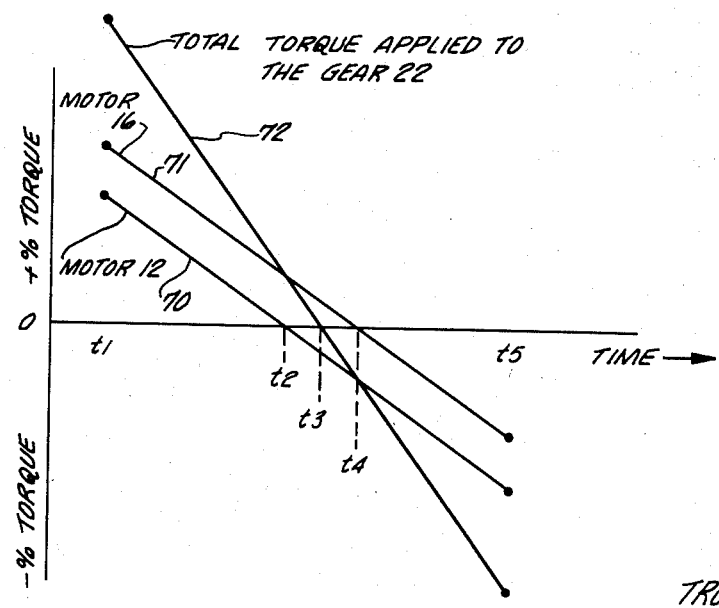
FIG. 3 is a graph illustrating the torque developed by each of the motors of the apparatus of FIG. 1 and of the total torque or force applied to the antenna by the motors of FIG. 1 as a function of time.

Referring now to FIG. 2, the four quadrants of operation of the motors 12 and 16 are illustrated. For example the first quadrant represents forward motor operation; the second quadrant represents forward braking operation; the third quadrant represents reverse motor operation, and the fourth quadrant represents reverse braking operation of the motors 12 and 16. To illustrate the anti-backlash characteristics of the apparatus of FIG. 1, assume that motors 12 and 16 are applying torque to the gear 22 represented by the curves 70 and 71 at time $t_1$. (See FIGS. 2 and 3.) The speed of the motors 12 and 16 may be any desired speed in the forward direction so that the motors are operating in the first quadrant as shown.

Assume that a momentary overhauling load illustrated by curve 72 such as a gust of wind is suddenly applied to the antenna 10 which tends to drive the antenna at a faster rate than desired along the illustrated axis of freedom. The overhauling load drives the shafts 39 and 39' of the phase shifting transformers 38 and 38' to increase the phase shift of the first command signal which decreases the torque developed by the motors 12 and 16. Because of the difference in torque developed by motors 12 and 16 the motor 12 will pass through its zero torque characteristic first at time $t_2$. At this time the total torque applied to the gear 22 is provided solely by the motor 16. At time $t_3$ each of the motors 12 and 16 are applying the same amount of torque in reverse directions so that the resultant torque applied to the antenna 10 by the two motors is zero. However, the torque applied to the gear 22 is not zero which results in continuous contact between the teeth of gears 22, 20 and 21 and prevents any backlash. At time $t_4$ the motor 16 passes through its zero torque characteristic and motor 12 provides the total torque applied to the gear 12. At time $t_5$ the motors 12 and 16 are operating in the forward braking quadrant (as generators) and applying the required reverse torque to compensate for the momentary overhauling load. The torque applied by the motors 12 and 16 is dependent only on the time phase relationship of the polyphase regulating signals applied to their field windings with respect to the armature currents. This permits the motors to change their operation from motor to generator action in a very short time thereby providing a fast response time for the system.

Various modifications of the apparatus of the present invention will be readily apparent to those skilled in the art. For example, the field windings of the motors 12 and 16 and of the frequency converters 42 and 42' may be wound on the rotor or stator structure as desired. The phase shifting transformers 38 and 38' may be replaced by suitable phase shifting networks which provide a phase shift in accordance with the position of the antenna 10. It is not necessary to employ the phase shifting transformers 36 and 36' to provide the desired torque differential developed by the motors 12 and 16. It is only necessary that some means be employed to provide a different phase shift in the field excitation applied to the motors 12 and 16. The apparatus of FIG. 1 may be employed to position any movable member. For example, a member movable along a straight line may be positioned by means of a suitable rack and pinion gear arrangement between the motors 12 and 16 and the movable member.

It should also be noted that since the motors 12 and 16 are always operated at the same speed only one frequency converter 42 and one frequency comparator 51 need be employed to generate the polyphase regulating signals of slip frequency for both motors. The polyphase regulating signals applied to one of the motor field windings may be phase shifted by appropriate means (such as a phase shifting transformer) to provide the necessary torque differential.

What is claimed is:

1. In an apparatus for controlling the position of a movable member the combination which comprises first and second alternating current motors, each of the motors having a shaft coupled to the movable member, an armature and a polyphase field winding, a source of energizing potential connected to the armature of each of the motors, slip frequency signal generating means responsive to the speed of each of the motors and to the frequency of the alternating current energizing potential for producing polyphase regulating signals of slip frequency, means coupled between the slip frequency signal generating means and each of the motors for applying the polyphase regulating signals to the field windings of each of the first and second motors, a source of control signals representative of the desired position of the movable member, means responsive to the control signals and to the position of the movable member for controlling the time phase relationship of the polyphase regulating signals applied to the field windings of each of the first and second motors to control the torque developed by the motors and the position of the movable member in accordance with the control signals, and means for controlling the time phase relationship of the polyphase regulating signals applied to the field windings of one of said first and second motors to maintain the torque developed by said one of the first and second motors at a value different than the torque developed by the other motor whereby at least one of the motors will always transmit torque to the movable member to prevent backlash.

2. The combination as defined in claim 1 wherein the slip frequency generating means includes a frequency converter coupled to each of the first and second motors.

3. The combination as defined in claim 1 wherein the slip frequency signal generating means includes an auxiliary frequency signal generator, means coupled between the source of energizing potential, the auxiliary frequency signal generator and at least one of the first and second motors for producing first and second alternating current command signals having a frequency difference representative of the slip frequency of the alternating current machine, each of the first and second command signals having the auxiliary frequency signal as one component thereof so that the auxiliary frequency signal cancels out when the algebraic difference of the first and second command signals is obtained and means for obtaining the algebraic difference of the first and second command signals to provide the polyphase regulating signals of slip frequency.

4. The combination as defined in claim 3 including switching means for reversing the phase sequence of the alternating current energizing potential supplied to the armatures and the field windings of each of the first and second motors when the motors are operating at approximately zero speed to permit the motors to operate in the reverse direction at a lower value of slip.

5. The combination as defined in claim 4 including at least one speed sensing unit connected to the shaft of one of the first and second motors for operating the switching means in response to the speed of the motors.

6. In a servo positioning apparatus for controlling the position of a rotary member the combination which comprises first and second alternating current motors, each of the motors having a shaft connected to the rotary member, an armature and a polyphase field winding, a source of energizing potential connected to the armature of each of the motors, an auxiliary frequency signal generator, means coupled between the source of energizing potential, the auxiliary frequency signal generator and at least one of the alternating current motors for producing first and second alternating current command signals having a frequency difference representative of the slip frequency of the motors, frequency comparator means for obtaining the algebraic difference of the first and second command signals to provide a polyphase regulating slip frequency signal for each motor, and means for applying the polyphase slip frequency signals to the field windings of the respective motors, a source of control signals representative of the desired position of the rotary member, means responsive to the control signals for controlling the time phase relationship of one of the first and second command signals, means responsive to the position of the rotary member for controlling the time phase relationship of one of the first and second command signals and means for controlling the time phase relationship of the polyphase regulating signals applied to the field windings of one of the first and second motors independently of the last two named means to maintain the torque developed by one of the first and second motors at a value different than the torque developed by the other motor whereby at least one of the motors will always transmit torque to the rotary member to prevent backlash.

7. The combination as defined in claim 6 wherein the means for producing the first and second command signals includes a frequency converter connected to the shaft of at least one of the first and second motors.

8. The combination as defined in claim 6 wherein the last named means includes a phase shifting transformer connected in series with one of the alternating current command signals.

9. The combination as defined in claim 7 including means for reversing the phase sequence of the alternating current energizing potential supplied to the armatures of each of the first and second motors in response to the speed of the motors.

References Cited in the file of this patent

UNITED STATES PATENTS

| | | |
|---|---|---|
| 1,667,718 | Connell | May 1, 1928 |
| 2,840,771 | Kamm | June 24, 1958 |

OTHER REFERENCES

Gutman, F. T.: Eighteen Ways to Control Backlash in Gearing, Product Engineering, Oct. 26, 1959, pages 19–21.

Standard Handbook for Electrical Engineers, Seventh Edition, McGraw Hill, New York, 1941, pages 694–704 of sec. 7.